(12) United States Patent
Takahashi et al.

(10) Patent No.: US 11,585,729 B2
(45) Date of Patent: Feb. 21, 2023

(54) BLOWING DUCT FOR CHASSIS DYNAMOMETER

(71) Applicant: MEIDENSHA CORPORATION, Tokyo (JP)

(72) Inventors: Toshimichi Takahashi, Ota (JP); Naoto Yamaguchi, Kumagaya (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/612,698

(22) PCT Filed: Jan. 8, 2020

(86) PCT No.: PCT/JP2020/000279
§ 371 (c)(1),
(2) Date: Nov. 19, 2021

(87) PCT Pub. No.: WO2020/235127
PCT Pub. Date: Nov. 26, 2020

(65) Prior Publication Data
US 2022/0205871 A1   Jun. 30, 2022

(30) Foreign Application Priority Data

May 21, 2019   (JP) .............................. JP2019-094924

(51) Int. Cl.
*G01M 17/007*   (2006.01)
(52) U.S. Cl.
CPC .............................. *G01M 17/0074* (2013.01)

(58) Field of Classification Search
CPC ................................................. G01M 17/0074
See application file for complete search history.

(56) References Cited

U.S. PATENT DOCUMENTS

| 3,926,043 A | 12/1975 | Marshall et al. |
| 2009/0266525 A1* | 10/2009 | Lambolez ......... G01M 17/0074 165/121 |

FOREIGN PATENT DOCUMENTS

| JP | 3-95946 U | 9/1991 |
| JP | 2000-275136 A | 10/2000 |
| JP | 4772059 B2 | 9/2011 |

* cited by examiner

*Primary Examiner* — Eric S. McCall
*Assistant Examiner* — Timothy P Graves
(74) *Attorney, Agent, or Firm* — Foley & Lardner LLP

(57) ABSTRACT

A duct body (101) of a blowing device provided in a chassis dynamometer includes a bottom wall (31), a top wall (32) and a pair of side walls (33) that form a flow passage having a rectangular cross section. In each of the side wall (33), a vertically elongated window part (42) is formed for enabling the passage of vehicle restraint member such as a chain (5). Each window part (42) is closed through the tiled arrangement of a few cover plates (53, 54), and a chain plate set (100). The chain plate set (100) is formed through the sandwiching of an elastic sheet member (61, 62) having a restraint member through hole (63) and a slit (64) between an inner plate (51) and an outer plate (52) each having an opening part (57, 58).

5 Claims, 14 Drawing Sheets

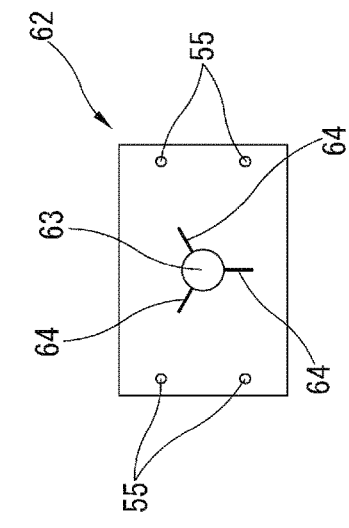
FIG. 7(a)
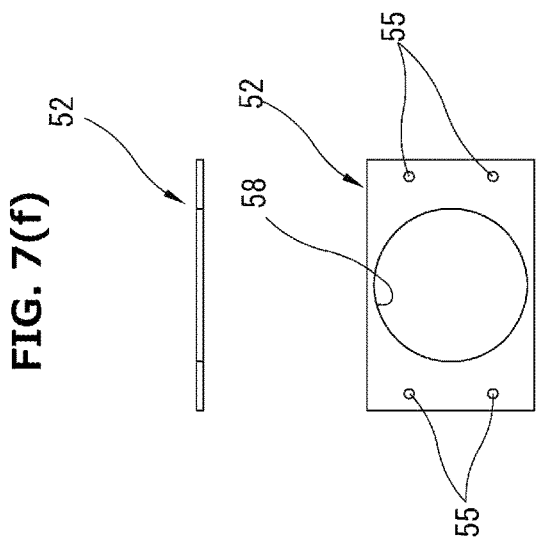
FIG. 7(b)
FIG. 7(c)
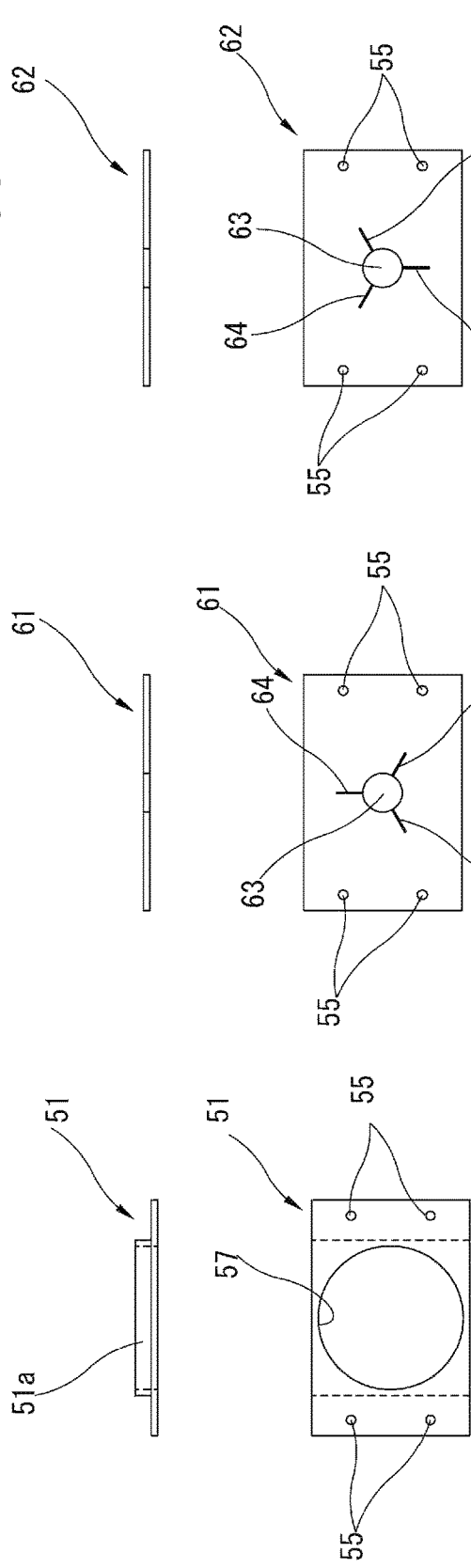
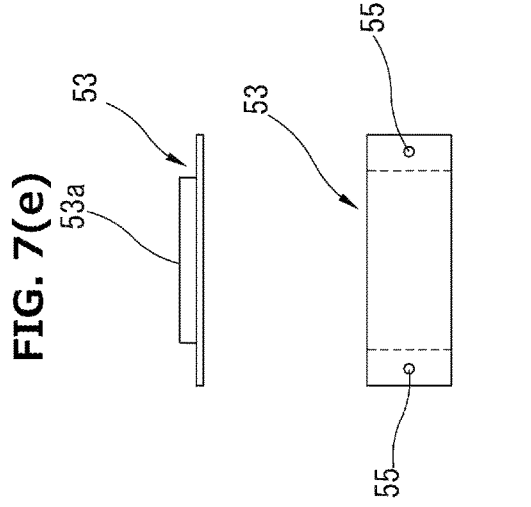
FIG. 7(d)
FIG. 7(e)
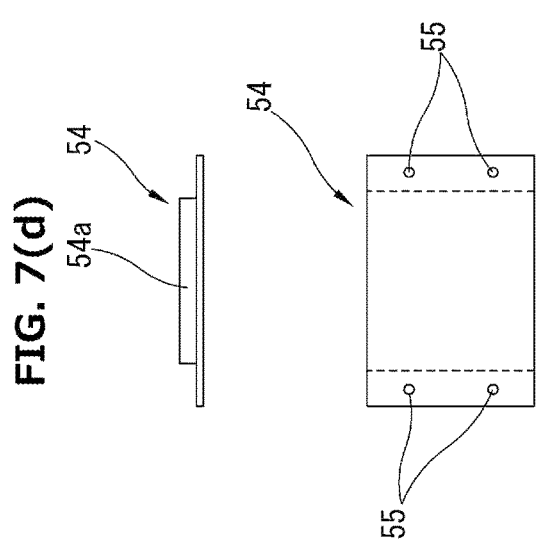
FIG. 7(f)

BLOWING DUCT FOR CHASSIS DYNAMOMETER

TECHNICAL FIELD

The present invention relates to a blowing duct for guiding, to a vehicle front surface, cooling air (in other words, traveling wind) generated by a blowing fan, in a chassis dynamometer for carrying out a vehicle running test on a table.

BACKGROUND TECHNOLOGY

In a chassis dynamometer for carrying out a vehicle running test in a state in which tires are placed on rollers, it is necessary to supply cooling air simulating vehicle traveling wind to a vehicle front surface by a blowing fan. In order to stably supply cooling air by the blowing fan, it is preferable to arrange a discharge port for cooling air at a position relatively close to the front surface of the vehicle provided with a radiator. However, since vehicle restraint members such as chains and belts are located in front of the vehicle placed on the chassis dynamometer, these vehicle restraint members interfere with a blowing duct, as a result of which it becomes difficult to arrange the discharge port for cooling air so as to be close to the vehicle.

To solve such a problem of the interference between the vehicle restraint members and the blowing duct, a patent document 1 discloses a structure in which a plurality of slits are formed to the side walls of a blowing duct, and belts for restraining a vehicle are obliquely arranged while passing through the slits. The unused slits through which the belts do not pass are closed by long and narrow plates attached by being slid from the upper side.

In general, by using a towing hook, a vehicle restraint member such as a belt is arranged so as to extend from the towing hook at the horizontal level or at an angle near to the horizontal level. However, a height position at which the vehicle restraint member is arranged is different from each vehicle type. In addition, the vehicle restraint member such as a belt vibrates mostly vertically accompanying the acceleration or deceleration of the vehicle. Therefore, in the patent document 1, the size in the vertical direction of each of the slits is large as compared with the size in the vertical direction of each of the belts, as a result of which a relatively large amount of air leaks through the gap between the belts and corresponding ones of the slits.

In other words, the patent document 1 merely discloses the closing of the unused slits, and fails to disclose the closing of a substantially unused opening area in one slit through which a belt passes.

In this way, if the leakage of air through a side wall of a blowing duct occurs, in general, the wind speed distribution of cooling air discharged from a rectangular discharge port becomes uneven, and it is not preferable in accuracy of a vehicle running test carried out by a chassis dynamometer.

PRIOR ART REFERENCE(S)

Patent Document(s)

Patent Document 1: Japanese Patent No. 4772059

SUMMARY OF THE INVENTION

A chassis dynamometer according to the present invention includes: a duct body including a bottom wall, a top wall and a pair of side walls that form a flow passage having a rectangular cross section, and provided to a discharge part of a blowing fan such that a distal end opening thereof is arranged so as to face a front surface of a vehicle; at least one vertically elongated window part provided to a pair of each of the side walls; a plurality of plate attachment parts provided at equal intervals so as to be arranged along each of side edges of the window part, so as to virtually divide the window part into a plurality of sections arranged vertically; an inner plate and an outer plate each having rigidity, wherein each of the inner plate and the outer plate has a size set to cover one or some of a plurality of the sections, is detachably attached to the window part via the plate attachment parts at a height position corresponding to that of a vehicle restraint member, and includes an opening part through which the vehicle restraint member passes; an elastic sheet member supported by being sandwiched between the inner plate and the outer plate, including a restraint member through hole smaller than the opening part, and formed with one or a plurality of slits extending from an opening edge of the restraint member through hole to an outer peripheral side thereof; and a cover plate having a size set to cover one or some of a plurality of the sections, and detachably attached to a section except a section at which the inner plate and the outer plate are positioned, via the plate attachment parts In the blowing duct, the inner plate and the outer plate are attached at an appropriate height position of the window part in a state in which the elastic sheet member is sandwiched between the inner plate and the outer plate, according to the height position of a vehicle restraint member different from each vehicle type. In a state in which the inner plate, the elastic sheet member and the outer plate are laminated, a smaller restraint member through hole of the elastic sheet member is positioned in the opening parts of the inner plate and the outer plate. A vehicle restraint member such as a chain or a belt is arranged so as pass through the restraint member through hole.

Although the vehicle restraint member vibrates during a running test, the elastic sheet member having slits allows the movement of the vehicle restraint member. In other words, the elastic sheet member closes the gap around the vehicle restraint member while allowing the vibration of the vehicle restraint member.

The inner plate and the outer plate sandwiching the elastic sheet member therebetween cover one or some of a plurality of sections of the window part formed by virtually dividing the window part, and the remaining sections are closed by attaching a cover plate having a size which is capable of covering one or some of the sections. Consequently, the whole of the window part is covered except a small gap formed between the restraint member through hole and the vehicle restraint member. Accordingly, the leakage of air at the time of the blowing becomes small.

Change in the height position of the vehicle restraint member (in other words, exchange of test vehicle) can be easily carried out by vertically changing the arrangement of the inner plate and the outer plate sandwiching the elastic sheet member therebetween and the cover plate in the window part.

In one preferable aspect of the present invention, the cover plate is composed of a cover plate having a size set to cover one of the sections, and a cover plate having a size set to cover a plurality of the sections, and the both cover plates are used to one window part by being combined with each other. In this way, by combining the cover plates having different sizes, the height position of the restraint member through hole can be changed into a plurality of levels, and the number of the cover plates can be reduced. That is, a reduction in the attaching/detaching work of the cover plates can be achieved.

In addition, in one preferable aspect of the present invention, a plurality of elastic sheet members are limited and sandwiched between the inner plate and the outer plate, and the elastic sheet members each have a slit, and a position of the slit of each of the elastic sheet members is different from each other. According to this configuration, when the vehicle restraint member relatively moves to the restraint member through hole, since the a plurality of the elastic sheet members including slits at positions different from each other are laminated, the gap formed around the vehicle restraint member becomes small.

In addition, in one preferable aspect of the present invention, the attachment parts are screw holes formed at each of the side edges of the window part, and screws passing through the inner plate and the outer plate or the cover plate are screwed to the respective screw holes. With these attachment members, a plate (inner plate, outer plate, cover plate) located at an arbitrary position can be attached and detached from the outside of the duct body. Therefore, when the height position of the vehicle restraint member is changed, it is possible to cope with it by exchanging some plates.

In addition, in one preferable aspect of the present invention, a flapper along a side edge on an upstream side of the window part so as to obliquely project toward an inside of the flow passage is further included. By the flapper, air flowing from the upstream side along the inner wall surface of the side wall is guided to the inside, and thereby the leakage of air flow through the restraint member through hole becomes small.

According to the present invention, the opening surface around the vehicle restraint member is covered with the elastic sheet member having the restraint member through hole formed with the slits, and thereby the leakage of air can be suppressed to the minimum while allowing the vibration of the vehicle restraint member during a running test.

In addition, change in the height position of the vehicle restraint member can be easily carried out by carrying out change in the arrangement or the exchange of the inner plate and the outer plate sandwiching the elastic sheet member therebetween and the cover plate.

BRIEF DESCRIPTION OF THE DRAWINGS

FIG. 7 is a drawing showing a side view and an upper view of each of an inner plate, an outer plate and a cover plate.

MODE FOR IMPLEMENTING THE INVENTION

In the following, one embodiment of the present invention will be explained in detail based on the drawings.

Figure 1:
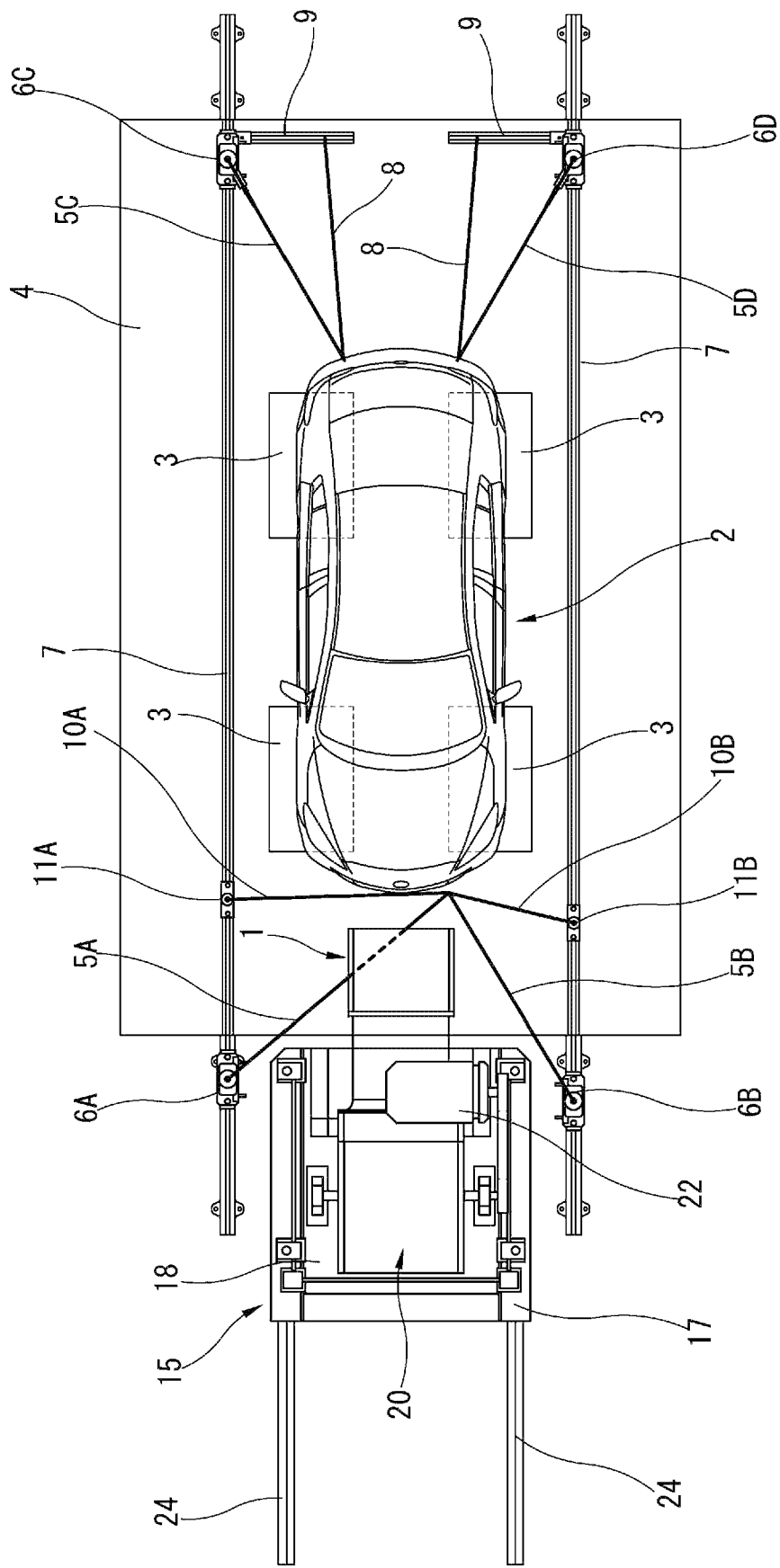
FIG. 1 is a plane view of a chassis dynamometer to which a blowing duct is applied.

FIG. 1 shows a configuration of the whole of a chassis dynamometer provided with a blowing duct 1 according to the present invention. The chassis dynamometer is provided with four rollers on which the front wheels and the rear wheels of a vehicle 2 to be tested are placed, and a running test of the vehicle 2 is carried out on the rollers 3 in a state in which the vehicle body of the vehicle 2 is restrained. Most part of each of the rollers 3 is located on the lower side of a pit cover 4, and, in four places of the pit cover 4, part of the peripheral surface of each of the rollers 3 is exposed.

During the test, the vehicle 2 is restrained at a predetermined position on the pit cover 4 by a plurality of vehicle restraint members such as four chains 5 (5A, 5B, 5C, 5D). One ends of the chains 5 are connected to the vehicle body by using towing hooks (not shown) of the vehicle body, and the other ends are connected to firm polls 6 (6A, 6B, 6C, 6D) standing vertically. Specifically, two chains 5C, 5D for restraining the rear part of the vehicle 2 extend from a pair of towing hooks positioned at the rear part of the vehicle body so as to be separated from each other in the right and left direction, so as to be expanded to the right and left direction along the horizontal surface, and are connected to respective polls 6C, 6D arranged at the rear of the vehicle 2. Two chains 5A, 5B for restraining the front part of the vehicle 2 extend from one towing hook positioned near the middle of the front part of the vehicle body, so as to be expanded to the right and left direction along the horizontal surface, and are connected to respective polls 6A, 6B arranged at the front of the vehicle 2. In addition, in the following explanation, the terms of "front", "rear", "left" and "right" are basically used according to the front and back and left and right directions of the vehicle 2 placed on the pit cover 4.

The bases of the lower ends of the polls 6 are supported by a pair of the guide rails 7 extending in the front and rear direction and provided so as to pass through the outer sides of the four rollers 3, and the positions of the polls 6 can be adjusted along the guide rails 7 in the front and rear direction. By adjusting the positions of the polls 6 in the front and rear direction, the angle (inclination angle with respect to the front and rear direction) of each of the chains 5 is adjusted. In addition, when the running test is carried out, based on the angle of each of the chains 5, the tension of each of the chains 5 is controlled such that a component force along the front and rear direction becomes a predetermined value. Moreover, the position of the attachment height of the end portion of each of the chains 5 in each of the polls 6 is adjustable such that each of the chains 5 becomes horizontal. That is, the position of the attachment height can be adjusted so as to be the same as the height position of a corresponding one of the towing hooks.

Basically, the vehicle 2 is pulled with an appropriate tension in the front and rear direction by the front and rear chains 5 (5A, 5B, 5C, 5D) so as to be restrained on the chassis dynamometer.

In the rear part of the vehicle 2, jumping-out preventing chains 8 extend from the respective right and left towing hooks toward the rear direction. The distal ends of the jumping-out preventing chains 8 are connected to hooks (not shown) of the floor surface. These hooks are supported by respective guide rails 9 extending along the right and left direction, and the positions of the hooks can be adjusted in the right and left direction. A pair of the jumping-out preventing chains 8 prevents the vehicle 2 from unexpected movement toward the front direction.

In the front part of the vehicle 2, in addition to the chains 5 (5A, 5B), rolling preventing chains 10 (10A, 10B) are provided. The rolling preventing chains 10 extend along the horizontal surface, and one end of each of the rolling preventing chains 10 is connected to the towing hook of the vehicle front part, and the other end is connected to a corresponding one of polls 11 (11A, 11B). The polls 11 are supported by the guide rails 7 also used for supporting the polls 6 for the chains 5, and the positions of the polls 11 can be adjusted in the front and rear direction. Each of the rolling preventing chains 10 is provided at an angle near the right and left direction of the vehicle 2 as compared with the angle of each of the chains 5, so as to regulate the movement in the right and left direction of the vehicle front part.

Figure 2:
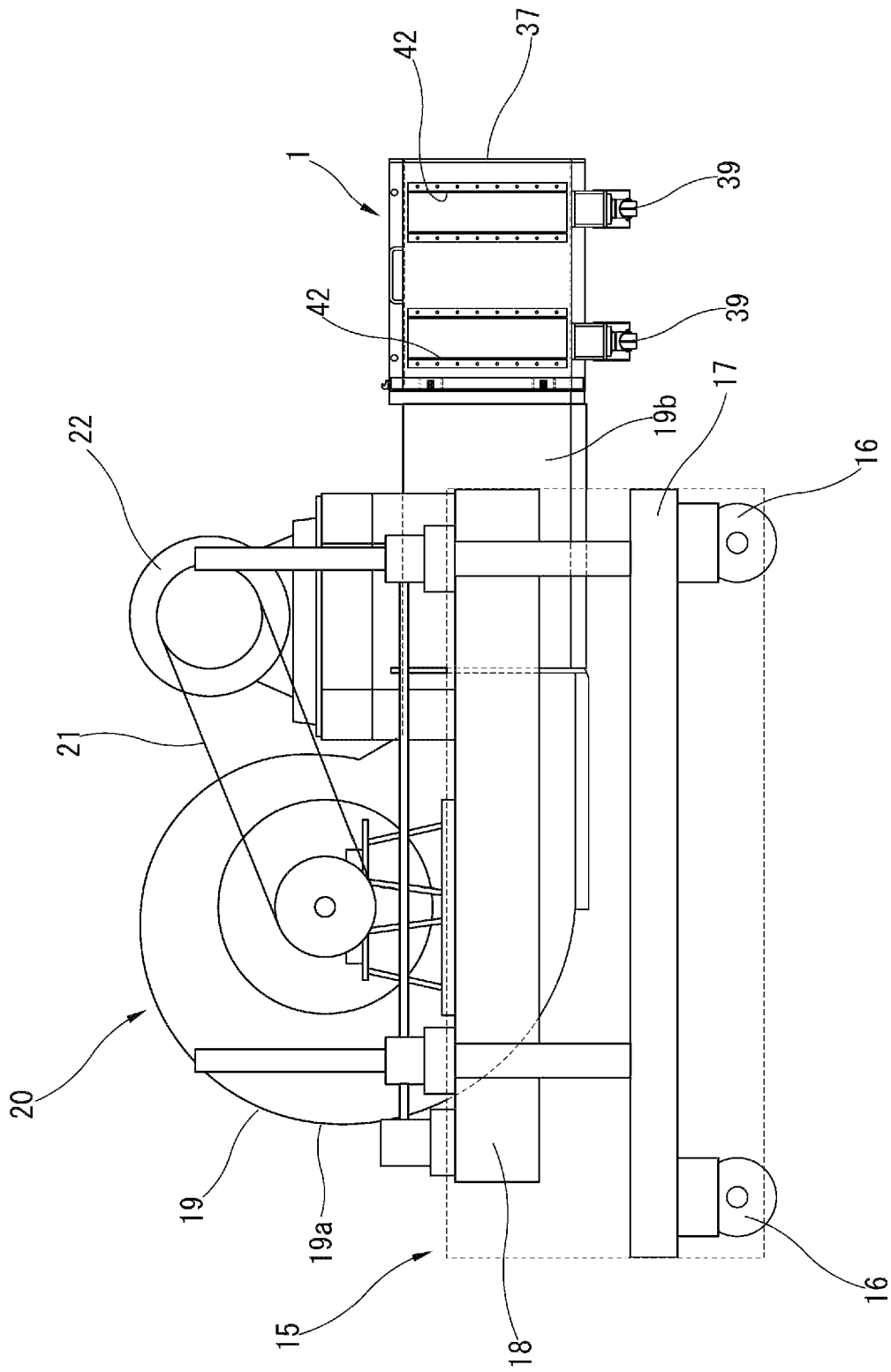
FIG. 2 is a side view of a blowing device.

In the front of the chassis dynamometer, a blowing device 15 is provided at a position facing the vehicle 2 on the pit cover 4. FIG. 2 is a side view of the blowing device 15. As shown in FIG. 1 and FIG. 2, the blowing device 15 is mainly composed of a base 17 including wheels 16, a bed 18 having a square frame shape in plane view which is supported on the base 17 so as to be vertically movable, a blowing fan 20 including a spiral casing 19 which is supported on the bed 18, and an electric motor 22 for driving the blowing fan 20 via a belt 21. The blowing fan 20 is a type for axially sending sucked air from one end surface of the casing 19, and the casing 19 includes a cylindrical part 19a accommodating an impeller (not shown), and a linear part 19b extending from the cylindrical part 19a in the tangent direction. The linear part 19b has a rectangular cross section, and the distal end of the linear part 19b extends toward the vehicle 2. In addition, the distal end of the linear part 19b that becomes a discharge part of the blowing fan 20 is connected with the blowing duct 1 according to the present invention. As shown in FIG. 2, the linear part 19b and the blowing duct 1 basically extend horizontally.

As shown in FIG. 1, the wheels 16 are guided along a pair of right and left guide rails 24, and thereby the position of the blowing device 15 can be adjusted in the front and rear direction. Therefore, the position in the front and rear direction of the blowing device 15 is set such that the opening (after-mentioned discharge port 37) of the distal end of the blowing duct 1 is located at an optima position corresponding to a vehicle type. In addition, since the height positions of the radiator and the air intake port of the front end of the vehicle 2 are different depending on each vehicle type, as mentioned above, by vertically moving the blowing fan 20 together with the bed 18, the height position of the distal end opening (discharge port 37) of the blowing duct 1 can be adjusted.

Here, as shown in FIG. 1, in the present embodiment, the chain 5A extending from the towing hook in the front part of the vehicle 2 to the right side has a positional relationship interfering with part (after-mentioned side wall 33 on the right side) of the blowing duct 1.

Figure 3:
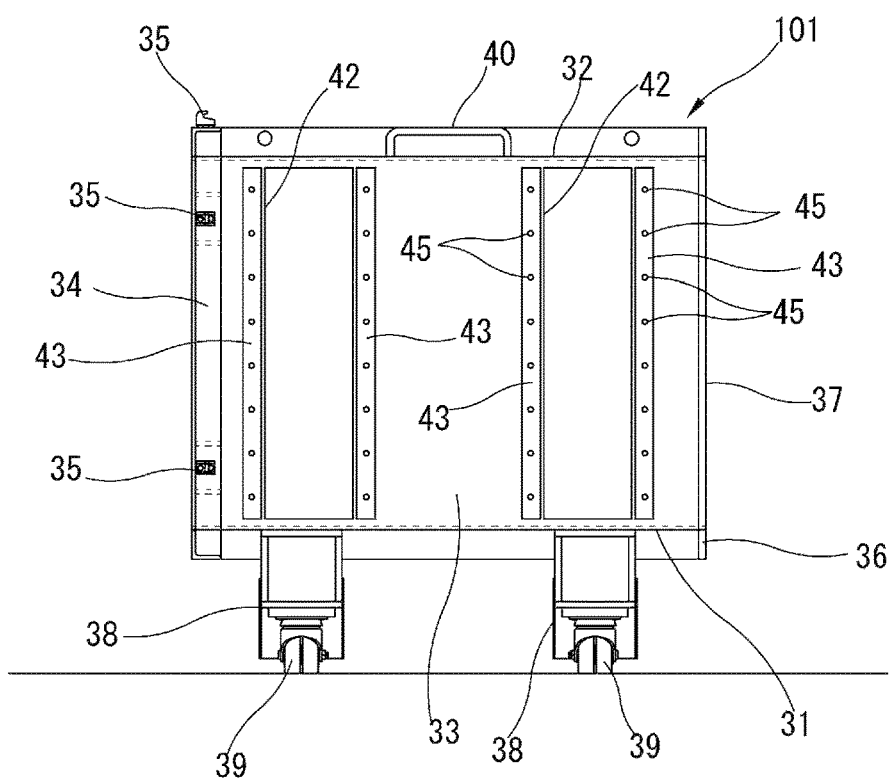
FIG. 3 is a side view of a duct body.
Figure 4:
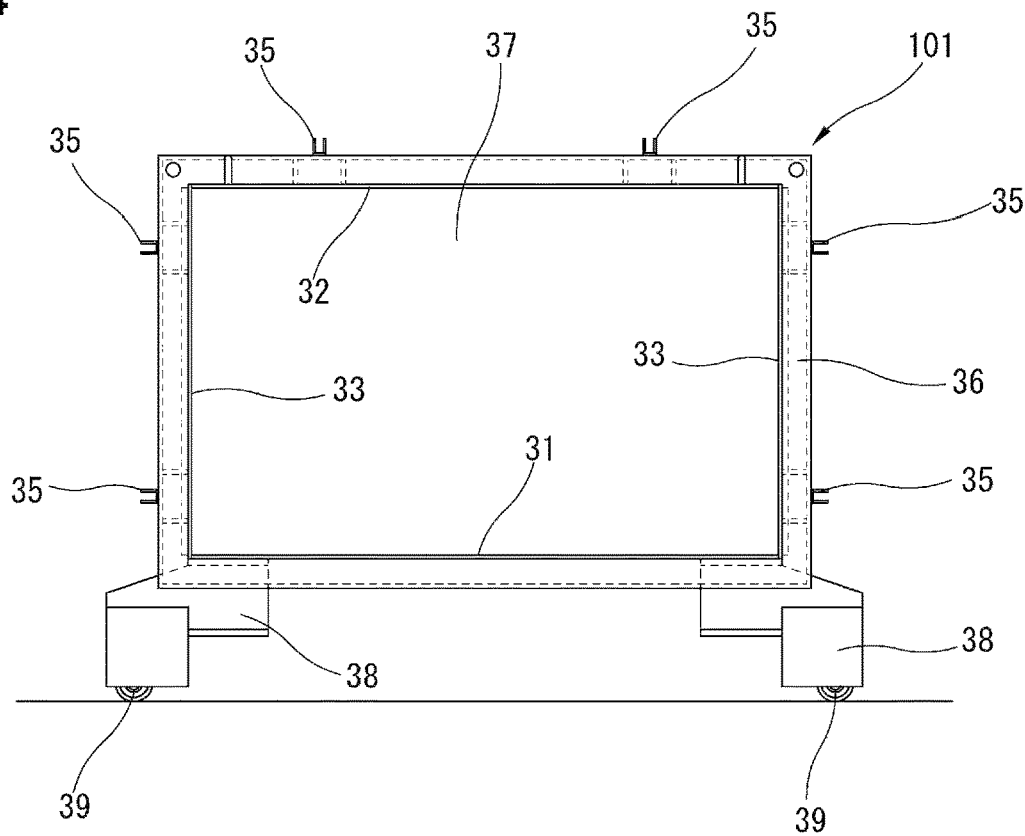
FIG. 4 is a front view of the duct body.
Figure 5:
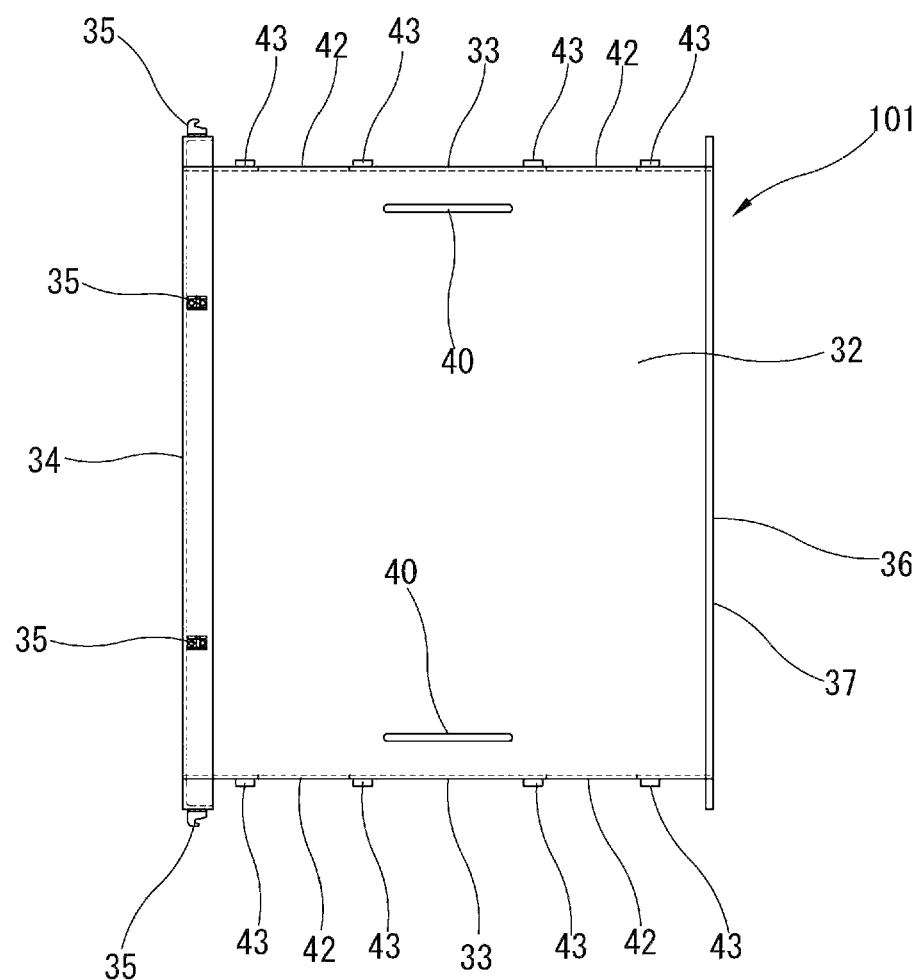
FIG. 5 is a plane view of the duct body.

Next, the blowing duct 1 will be explained with reference to FIG. 3 to FIG. 5. The blowing duct 1 mainly includes a duct body 101 formed by combining steel plates by, for example, welding. FIG. 3 is a side view of the duct body 101 when viewed from the left side. FIG. 4 is a front view of the duct body 101 when viewed from the vehicle 2 side. FIG. 5 is a plane view of the duct body 101 when viewed from the upper side.

The duct body 101 has a square cylindrical shape, and includes a bottom wall 31, a top wall 32 and a pair of side walls 33 each made from a steel plate, so as to form a flow passage having a rectangular cross section. In the illustrated example, the duct body 101 has the same cross sectional shape in each part along a flow direction. In other words, the cross sectional shape of the flow passage does not change, and is constant over the entire length of the blowing duct 1. In addition, in the present invention, the cross sectional shape of the flow passage may not always be constant.

The end portion on the front side of the duct body 101, namely, the end portion of the duct body 101 to be connected to the distal end of the casing 19 in the blowing device 15 is formed with a frame-shaped attachment flange part 34 formed by folding the end edges of the four walls (bottom wall 31, top wall 32, side walls 33) so as to have a U shape or J shape in cross section. The peripheral edge of the attachment flange part 34 is provided with, at a plurality of positions thereof, hooks 35 for fixing the duct body 101 (namely, the blowing duct 1) to the casing 19. Toggle clamps (not shown) are arranged at the distal end edge of the casing 19 so as to correspond to the respective hooks 35, and by the fastening of the toggle clamps, the blowing duct 1 is fixed to the distal end of the casing 19.

The end portion on the rear side of the duct body 101 is provided with an outlet-side flange part 36 along the surface orthogonal to the flow direction, and the distal end opening of the blowing duct 1, namely, the circumference of the discharge port 37 is surrounded by the outlet-side flange part 36. As shown in FIG. 4, the discharge port 37 has a rectangular shape in which a dimension in the right and left direction is larger than a dimension in the vertical direction.

The bottom wall 31 of the duct body 101 is attached with, at total four positions thereof, casters 39 via brackets 38. In a state of being detached from the casing 19, by the casters 39, the blowing duct 1 can be easily moved on the floor. In addition, in a state in which the blowing duct 1 is attached to the casing 19 of the blowing device 15, the casters 39 are away from the floor (see FIG. 2). That is, the vertical position of the blowing duct 1 can be adjusted together with the casing 19.

The top wall 32 is provided with a pair of handles 40 used for moving the blowing duct 1 on the floor in a state of being detached from the casing 19.

As shown in FIG. 3, two window parts 42 are opened on the respective front and rear sides of a pair of each of the side walls 33. That is, the duct body 101 is provided with totally four window parts 42. The four window parts 42 basically have the same structure. Although FIG. 3 shows the left-side side wall 33, two window parts 42 are also opened on the respective front and rear sides of the right-side side wall 33, so as to be symmetrical to the left-side side walls 33.

Each of the window parts 42 has a vertically elongated rectangular shape. The upper end of each of the window parts 42 reaches to a position near the upper edge of a corresponding one of the side walls 33, and the lower end thereof reaches to a position near the lower edge of a corresponding one of the side walls 33. In other words, except the upper edge and the lower edge required for securing the strength of the duct body 101, the window parts 42 are formed over substantially the whole of the side walls 33 in the vertical direction.

Each of the front and rear-side side edges of each of the window parts 42 is attached with a retainer 43 made from a metal plate and having a long and narrow belt shape. As plate attachment parts, a plurality of screw holes 45 are formed on a pair of each of the retainers 43 so as to sandwich each of the window parts 42 from the front side and the rear side, so as to be arranged at equal intervals in the vertical direction. In one embodiment, eight screw holes 45 are vertically arranged on each of the side edges of each of the window parts 42. That is, in one embodiment, each of the window parts 42 is virtually defined into eight sections vertically arranged, and one screw hole (two screw holes on the front and rear sides) 45 is formed in each of the sections.

In a use state, each of the window parts 42 is closed through the tiled arrangement of square metal plates each including an inner plate 51, an outer plate 52 and cover plates 53, 54. Accordingly, the blowing duct 1 is composed so as to include the duct body 101, the inner plate 51, the outer plate 52 and the cover plates 53, 54. In addition, in FIG. 7, a front view and an upper view of each component, such as the inner plate 51, arranged on the respective upper and lower sides are shown.

As shown in FIG. 7(d) and FIG. 7(e), cover plates 53, 54 are components for simply covering the opening surface of a wind part 42, and are formed with, at the both side edges of each of the cover plates 53, 54, through holes 55 through which the after-mentioned attachment screws 66 are pass. In addition, the middle parts of the cover plates 53, 54 corresponding to the opening width of the window part 42 each have a thick thickness as compared with the plate thickness at the both side edges overlapping the retainers 34 of each of the cover plates 53, 54, and serve as thick parts 53a, 54a. The step difference between the thick part 53a and the thin part at the both side edges and the step difference between the thick part 54a and the thin part at the both side edges each correspond to the sum of the plate thickness of a side wall 33 and the plate thickness of a retainer 34. Consequently, in a state of being attached to the window part 42, the inner wall surface of the side wall 33 and the inner surfaces of the thick parts 53a, 54a are continuous on the same plane (see FIG. 6).

Here, the size in the vertical direction of the cover plate 53 is different from that of the cover plate 54. The cover plate 53 has a size set to cover one section of the eight sections of the window part 42, and the cover plate 54 has a size set to cover two sections of the eight sections. In addition, corresponding to the sizes, the cover plate 53 has one through hole 55 at each of the front and rear side edges thereof, and the cover plate 54 has two through holes 55 at each of the front and rear side edges thereof. As will be mentioned below, the cover plates 53, 54 having different sizes are used by being appropriately combined.

The inner plate 51 (FIG. 7(a)) and the outer plate 52 (FIG. 7(f)) are used by being laminated such that the inner plate 51 is positioned inside and the outer plate 52 is positioned outside. In one embodiment, the inner plate 51 and the outer plate 52 each have a size set to cover two sections of the eight sections of the window part 42, and circular opening parts 57, 58 are respectively formed in the middles of the inner plate 51 and the outer plate 52. In one embodiment, the size of the opening part 57 of the inner plate 51 is equal to that of the opening part 58 of the outer plate 52. However, in the present invention, the sizes and the shapes of the opening parts 57, 58 may be different from each other. In the illustrated example, in consideration of the vibration of a chain 5 during the test, each of the opening parts 57, 58 is formed as a circle so as to have a diameter as large as possible in the size of a corresponding one of the plates 51, 52.

Similar to the cover plates 53, 54, the inner plate 51 has a thick part 51a so as to form the same plane as the inner wall surface of the side wall 33, and the opening part 57 is opened to the thick part 51a. In addition, the inner plate 51 has, at each of the front and rear side edges thereof, two through holes 55 for attachment screws 66.

The outer plate 52 is a plate having a fixed plate thickness with no thick part, and includes, at each of the front and rear side edges thereof, two through holes 55.

Elastic sheet members 61, 62 shown in FIG. 7(b) and FIG. 7(c) are sandwiched between the inner plate 51 and the outer plate 52. Each of the elastic sheet members 61, 62 is made from a rubber sheet having a thickness of, for example, several millimeters, and also has two through holes 55 at each of the side edges thereof so as to be attached to the inner plate 51 and the outer plate 52 by being laminated. In addition, in the illustrated example, although the outer size of each of the elastic sheet members 61, 62 is the same as that of each of the inner plate 51 and the outer plate 52, the elastic sheet members 61, 62 each can be formed to have a slightly smaller outer size. Each of the elastic sheet members 61, 62 has, in the middle thereof, a circular restraint member through hole 63, and a plurality of slits 64 are radially formed from the opening edge of the restraint member through hole 63 toward the outer peripheral side. In the illustrated example, three slits 64 are formed at every 120°. The three pieces formed in a rubber sheet which is formed by being divided via the slits 64 are each easily deformed by external force, and by the elasticity of the rubber sheet, it returns to an initial flat shape. In addition, as can be understood easily from the drawing, as a component, the elastic sheet member 61 is the same as the elastic sheet member 62, and the shape of the elastic sheet member 61 corresponds the shape of the elastic member 62 which is simply turned upside down. Here, the restraint member through hole 63 is set to have a minimum size required for the passage of a chain 5. In addition, the forming range (the position at the outermost peripheral end) of the slits 64 is positioned on the inner side from the circles of the opening parts 57, 58 of the inner plate 51 and the outer plate 52.

Figure 6:
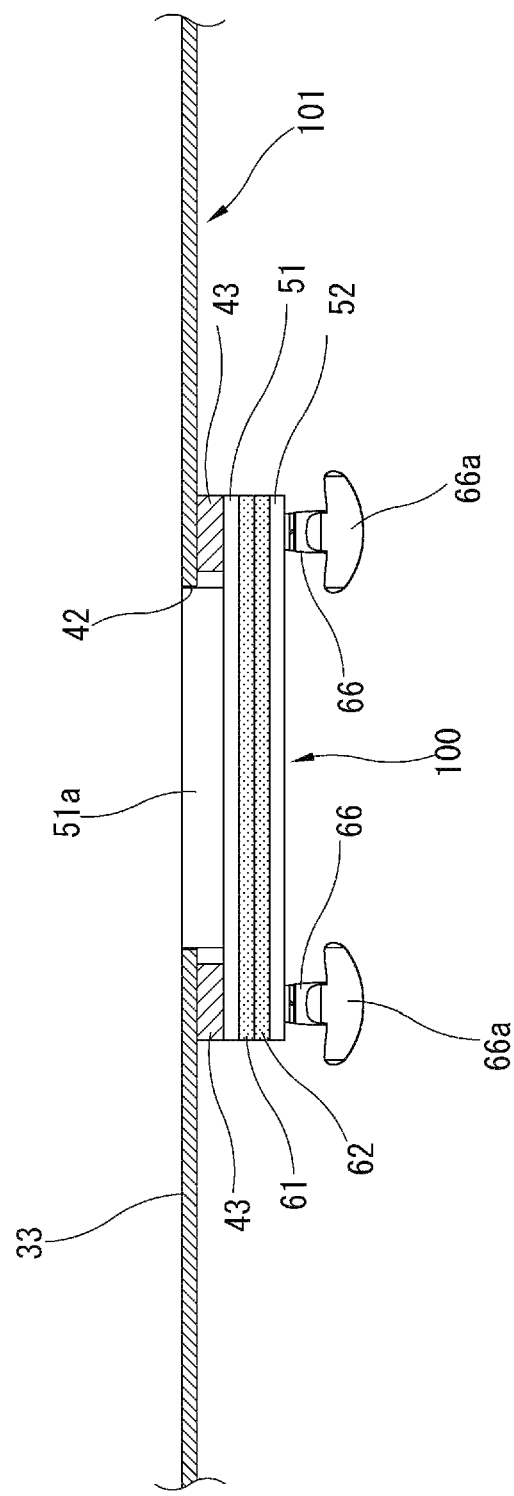
FIG. 6 is a sectional view showing a state in which a chain plate set is attached to a window part.

FIG. 6 is a sectional view showing a state in which the inner plate 51, the elastic sheet members 61, 62, and the outer plate 52 are laminated and attached to the side wall 33. As shown in the illustrated example, by the attachment screws 66 passing though the inner plate 51, the elastic sheet members 61, 62, and the outer plate 52, these are attached in a state of being laminated so as to close the window part 42. The elastic sheet members 61, 62 having flexibility are supported by being sandwiched between the inner plate 51 and the outer plate 52 having rigidity. The attachment screws 66 each have a pinching part 66a so as be rotatably operated with fingers.

Figure 8:
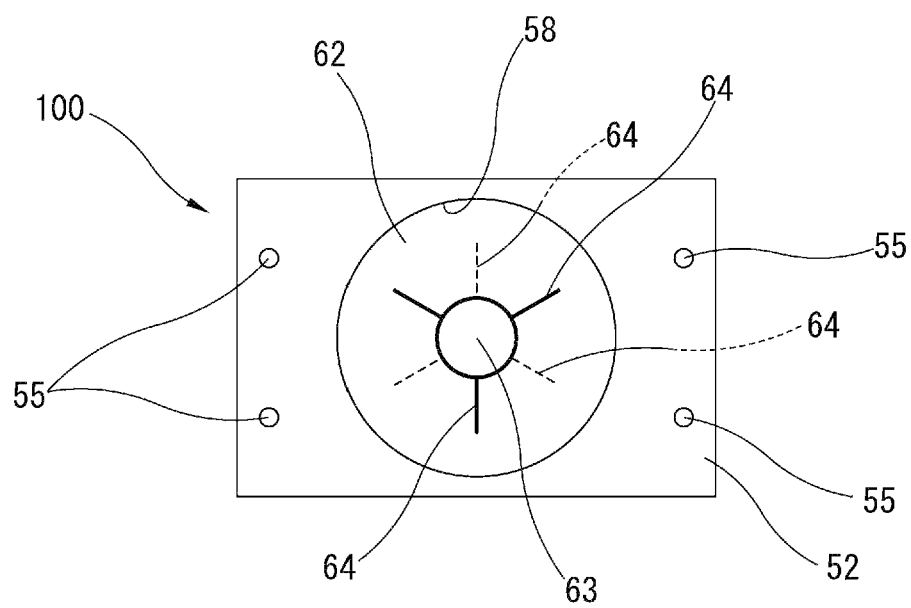
FIG. 8 is a side view when viewing, from outside, the chain plate set in a lamination state.

FIG. 8 is a drawing when viewing, from outside, the laminated inner plate 51, elastic sheet members 61, 62, and outer plate 52 (for convenience sake, hereinafter is referred to as a chain plate set 100). As shown in the drawing, the restraint member through holes 63 and the slits 64 are positioned on the inner peripheral side of the opening parts 57, 58 of the inner plate 51 and the outer plate 52. In addition, the slits 64 of the elastic sheet member 61 are arranged at angle positions not overlapping the slits 64 of the elastic sheet member 62.

The chain plate set 100 formed with such restraint member through holes 63 is arranged at one of two window parts 42 in a side wall 33. That is, as mentioned above, the chain plate set 100 is arranged at a position where a chain 5 that is a vehicle restraint member crosses a side wall 33, and the other sections are closed by the cover plates 53, 54.

In an example shown in FIG. 1, since the chain 5 (5A) interferes with the right-side side wall 33, the chain plate set 100 is arranged at a corresponding position in one of the window parts 42 of the right-side side wall 33. The other parts are closed by the cover plates 53, 54.

As is clear from FIG. 8, if the chain 5 passing through the restraint member through holes 63 vibrates, pieces of each of the elastic sheet members 61, 62 which are separated from each other via the slits 64 are deformed easily, and the vibration and the displacement of the chain 5 are allowed. Since part of each of the elastic sheet members 61, 62 is deformed by following the vibration and the displacement of the chain 5, the gap (gap where the leakage of air occurs) formed around the chain 5 is small. In particular, in the illustrated example, since the two elastic sheet members 61, 62 are laminated such that the positions of the slits 64 are different from each other, the gap formed in one of the elastic sheet members 61, 62 due to the displacement of the chain 5 is covered with the other of the elastic sheet members 61, 62, and thereby the gap where the leakage of air occurs becomes extremely small.

In addition, in the present invention, two elastic sheet members 61, 62 may not always be used, and one elastic sheet member may be used, or three or more elastic sheet members may be used by being laminated.

The position of the chain plate set 100 in a vertically elongated window part (42) can be appropriately changed in accordance with the height position of a chain 5 which is different from each vehicle type.

Figure 9:
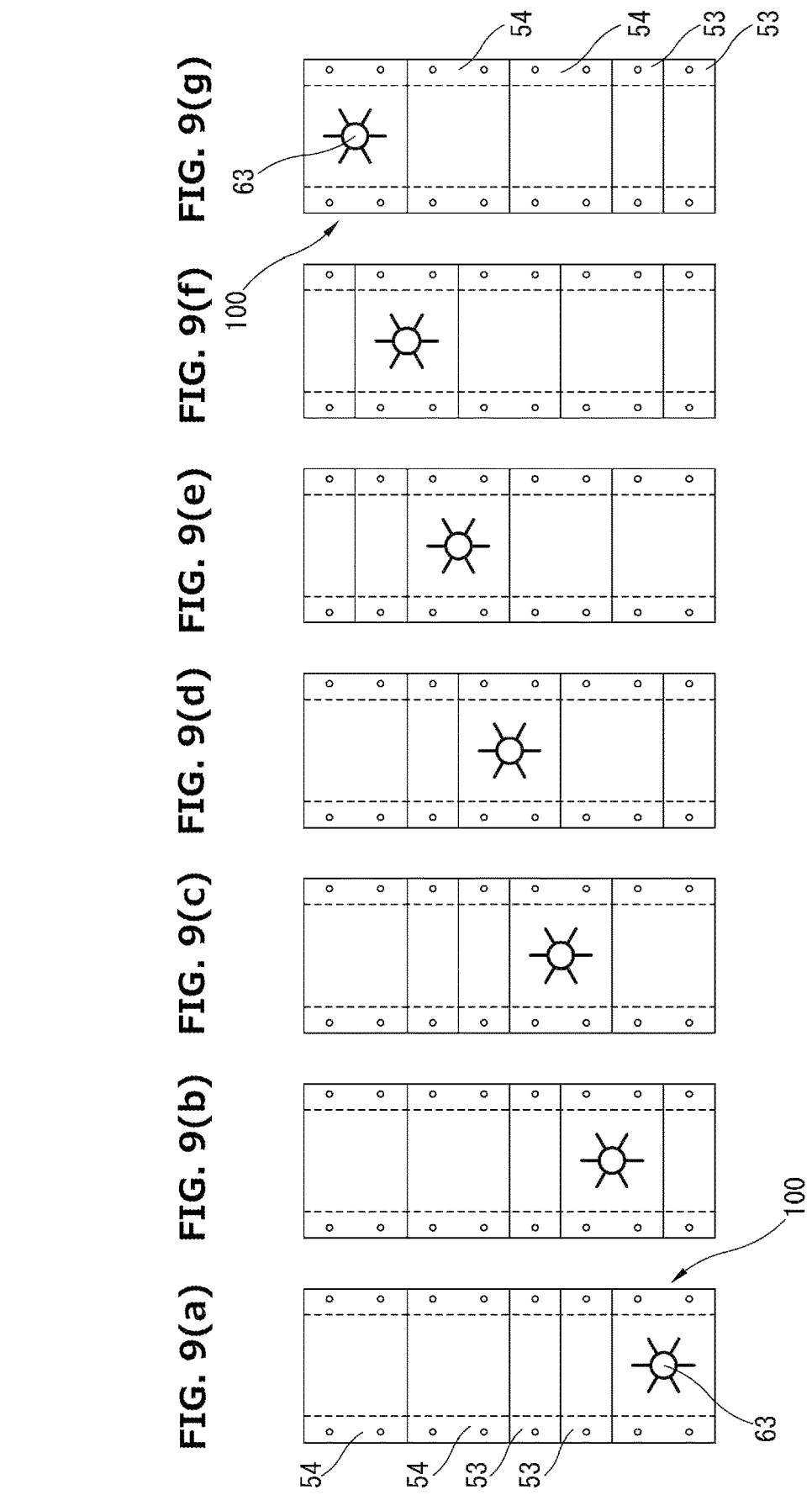
FIG. 9 is an explanatory view in which the height of the chain plate set is stepwisely changed.

FIG. 9 shows an example of the arrangement of the chain plate set 100 and the cover plates 53, 54 with respect to a change in the height of the chain 5. In this example, the combination of two cover plates 53 and two cover plates 54 is used. In FIG. 9(a), the chain plate set 100 is located at the lowest position of a window part 42, and the remaining sections are closed by the cover plates 53, 54. In FIG. 9(g), the chain plate set 100 is located at the highest position of the window part 42, and the remaining sections are closed by the cover plates 53, 54. In FIG. 9(b) to FIG. 9(f), the position of the chain plate set 100 is gradually changed to the upper side. As can be understood from FIG. 9, although, in the illustrated example, the chain plate set 100 has a size set to cover two sections, as the cover plates 53, 54, cover plates 53 each corresponding to one section are included, and thereby the height position of the restraint member through holes 63 can be changed in seven levels. If the all cover plates each had the same size as the chain plate set 100 (that is, a size corresponding to two sections), the height position of the restraint member through holes 63 could be changed in only four levels.

On the other hand, if the all cover plates each had a size corresponding to one section like a cover plate 53, the number of the cover plates became large, and attaching/detaching work would be complicated.

Since the chain plate set 100 and the cover plates 53, 54 can be attached and detached from the outside of the blowing duct 1 via the attachment screws 66, without detaching other cover plates 53, 54, replacement can be carried out. For example, when the arrangement is changed from one of the modes to another mode of FIG. 9, some cover plates 53, 54 are detached, and the chain plate set 100 is moved, following which the detached cover plates 53, 54 are attached to a vacant place. That is, it is only necessary to carry out the attachment and detachment of some cover plates 53, 54, and the attachment and detachment of cover plates 53, 54 whose positions do not need to be changed are not necessary.

Therefore, it is possible to easily cope with the exchange of the vehicle 2 (change in vehicle type) which becomes a test object in the chassis dynamometer. In addition, the leakage of air flowing through the window part 42 can be minimized regardless of vehicle types.

In this way, since the leakage of air flow is small, a speed distribution at the discharge port 37 becomes more uniform.

In addition, in the window part 24, by the presence of the thick parts 53a, 54a of the cover plates 53, 54 and the thick part 51a of the inner plate 51, the unevenness of the inner wall surface on which air flows becomes minimum. Therefore, the turbulence of air flow at the window part 42 is small. This is also advantageous in uniformization of the speed distribution.

The shape and the size of each of the opening parts 57, 58 and the restraint member through holes 63 are not limited to the above embodiment, and various shapes and sizes can be applied.

Figure 10:
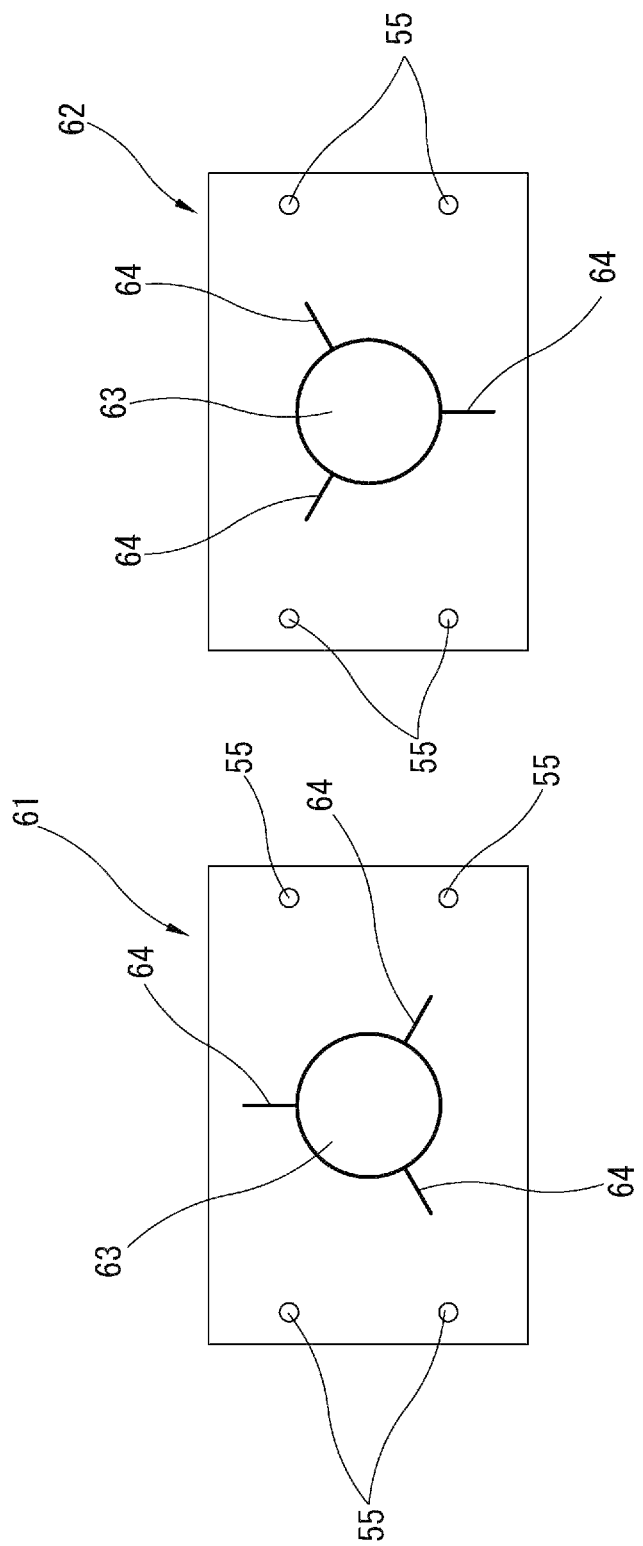
FIG. 10 is a side view of two elastic sheet members each formed with a restraint member through hole having a large diameter.

For example, FIG. 10 shows elastic sheet members 61, 62 each having a restraint member through hole 63 having an enlarged diameter in order to apply them to a relatively thick vehicle restraint member. The elastic sheet members 61, 62 can be used in a laminated state, or one of them may be used singly.

Figure 11B:
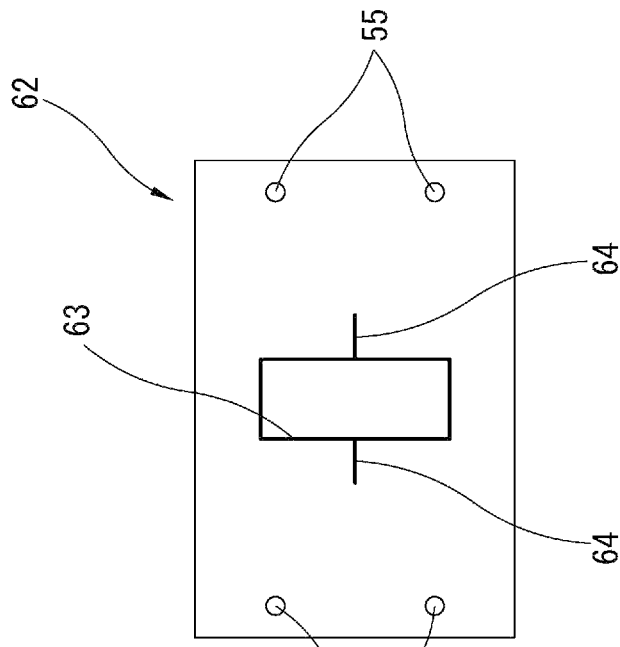
FIG. 11 is a side view of two elastic sheet members each formed with a rectangular restraint member through hole.
Figure 11A:
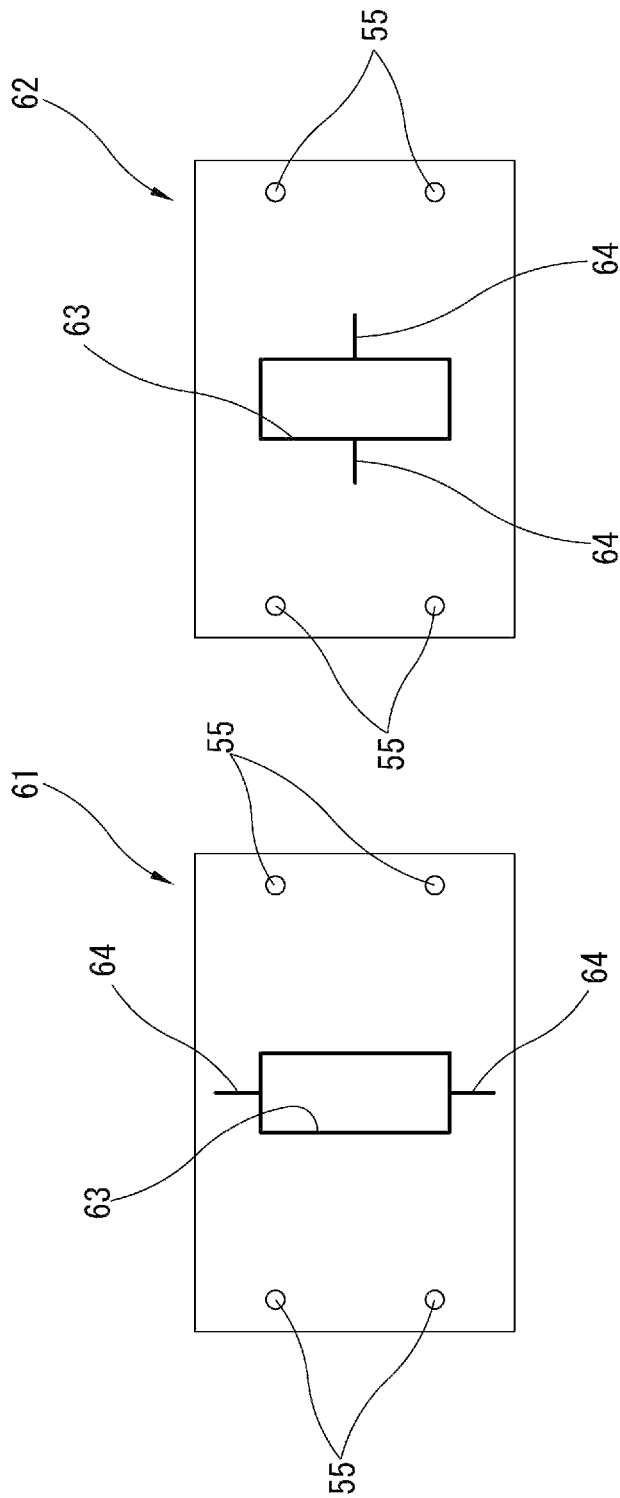

In addition, FIG. 11 shows an example of elastic sheet members 61, 62 suitable in case where, as a vehicle restraint member, a belt having a flat cross section is used. In the elastic sheet members 61, 62 in this embodiment, each of the elastic sheet members 61, 62 has a rectangular restraint member through hole 63 so as to be suitable for the passage of the belt. In addition, the elastic sheet member 61 is formed with slits 64 along the vertical direction, and the elastic sheet member 62 is formed with slits 64 along the front and rear direction. For example, these elastic sheet members 61, 62 are used in a laminated state. The shape of each of the opening parts 57, 58 of the inner plate 51 and the outer plate 52 may be a circle shape similar to the embodiment mentioned above, or may be a vertically elongated rectangular shape.

Figure 12:
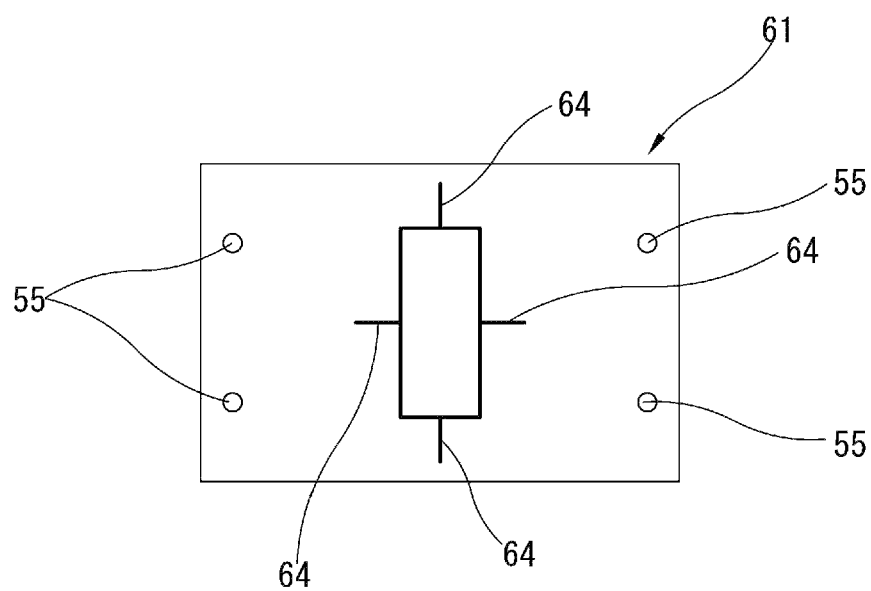
FIG. 12 is a side view of an elastic sheet member having a rectangular restraint member and slits arranged in a cross shape.

FIG. 12 shows an example in which an elastic sheet member 61 having a rectangular restraint member through hole 63 is formed with slits 64 along the vertical direction and the front and rear direction. That is, the slits 64 are formed in a cross shape. The elastic sheet member 61 can be also used singly, or can be used in a state in which a plurality of elastic sheet members 61 are laminated. In addition, the elastic sheet member 61 can be used in a state of being laminated with another elastic sheet member in which the slits 64 are formed at different positions.

Figure 13:
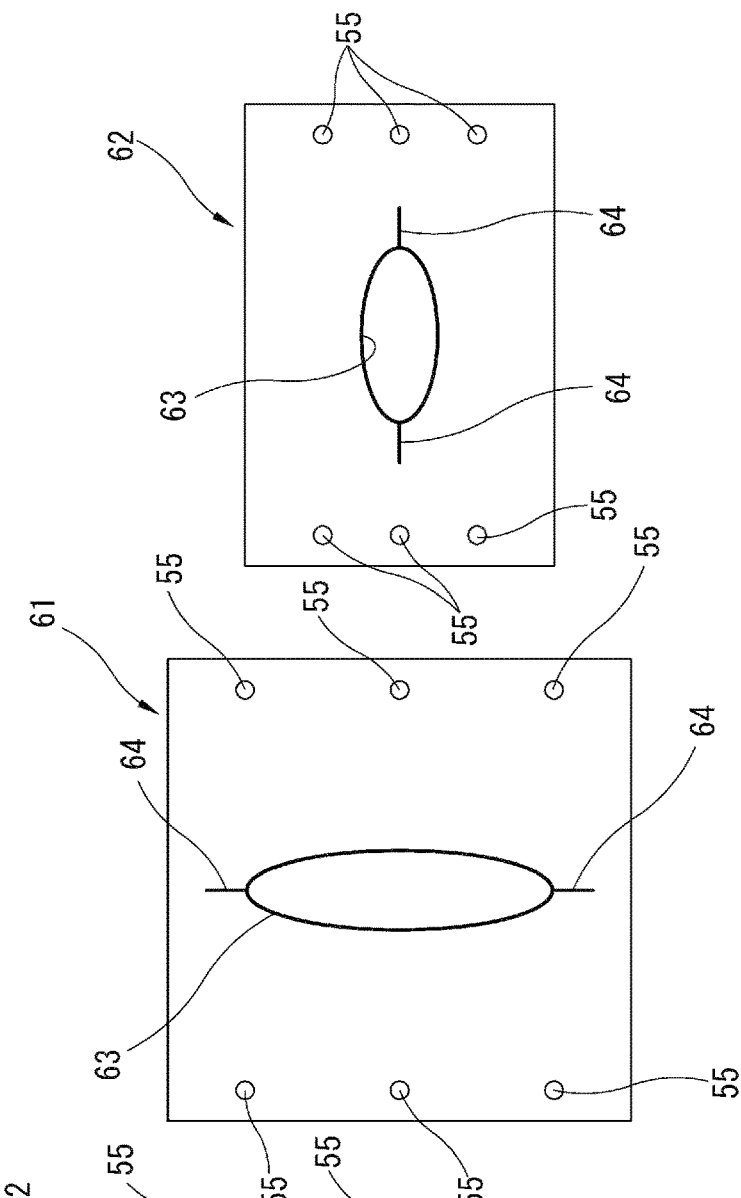
FIG. 13 is an explanatory view showing a plate set having an opening part and restraint member through holes each having an oval shape.

In addition, in an example of FIG. 13, the opening parts 57, 58 of the inner plate 51 and the outer plate 52, and the restraint member through holes 63 of the elastic sheet members 61, 62 are each formed in an oval shape.

In this example, the inner plate 51 and the outer plate 52 each have a size set to cover three sections of the eight sections of the window part 42, and are respectively formed with vertically elongated oval opening parts 57, 58. Each of the front and rear side edges of each of the inner plate 51 and the outer plate 52 is formed with three through holes 55 at intervals corresponding to the intervals of the screw holes 45 on the window part 42 side.

The elastic sheet member 61 has the same size as that of each of the inner plate 51 and the outer plate 52, namely, it has a size set to cover three sections of the eight sections of the window part 42, and three through holes 55 are arranged at each of the side edges thereof. The elastic sheet member 61 is formed with a vertically elongated oval restraint member through hole 63 so as to penetrate therethrough, and a pair of slits 64 is vertically formed from the opening edge of the restraint member through hole 63. The restraint member through hole 63 has a thin oval shape (that is, flat) as compared with the opening parts 57, 58 of the inner plate 51 and the outer plate 52.

The elastic sheet member 62 used in a state of being laminated with the elastic sheet member 61 has a size set to cover two sections of the eight sections of the window part 42. In addition, the long diameter of the oval restraint member through hole 63 of the elastic sheet member 61 is set to be a size which can be covered with the elastic sheet member 62 having a size corresponding to the two sections. The elastic sheet member 62 is formed with a restraint member through hole 63 having an oval shape elongated in the front and rear direction so as to penetrate therethrough, and a pair of slits 64 is formed in the front and rear direction from the opening edge of the restraint member through hole 63. The short diameter (that is, the dimension in the vertical direction) of the restraint member through hole 63 of the elastic sheet member 62 is substantially equal to the short diameter (that is, the dimension in the front and rear direction) of the restraint member through hole 63 of the elastic sheet member 61.

Therefore, in a state in which the two elastic sheet members 61, 62 are laminated, a substantially circular opening is formed.

In addition, three through holes 55 are arranged at each of the side edges of the elastic sheet member 62 at intervals that are half of the intervals of the screw holes 45 of the window part 42. With this, the elastic sheet member 62 can be arranged and laminated at the height position of the middle of the elastic sheet member 61, and, in addition, it can be arranged at a position close to the upper side or at a position close to the lower side. That is, the substantial opening position of the restraint member through hole 63 of the elastic sheet member 62 can be arranged on the upper side or the lower side within the opening portions 57, 58 of the inner plate 51 and the outer plate 52.

Figure 14:
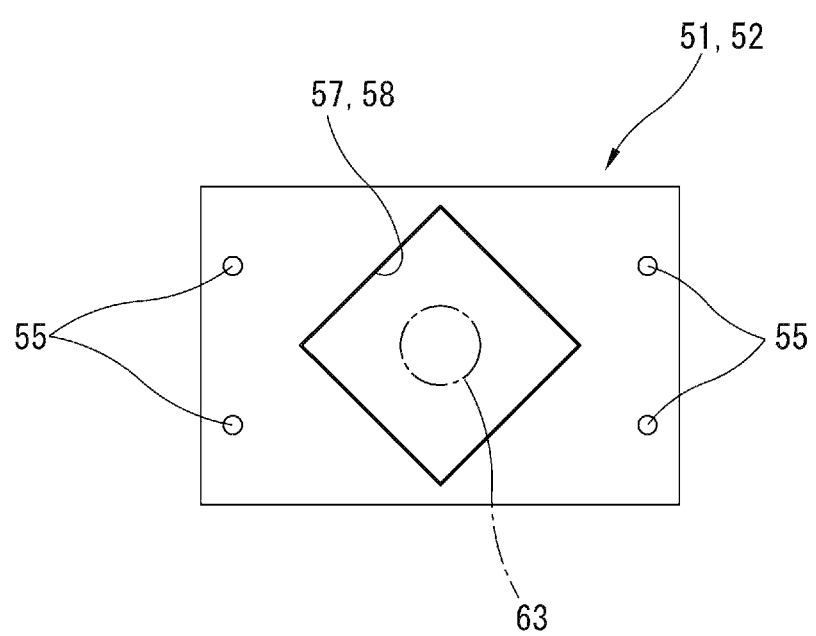
FIG. 14 is a side view of an inner or outer plate having a square opening part.

FIG. 14 shows an example in which the opening parts 57, 58 of the inner plate 51 and the outer plate 52 are each formed in a square shape which is inclined at an angle of 45°. In addition, in the illustrated example, the inner plate 51 and the outer plate 52 of FIG. 14 are combined with the elastic sheet members 61, 62 having the circular restraint member through holes 63 shown in FIG. 7.

Figure 15:
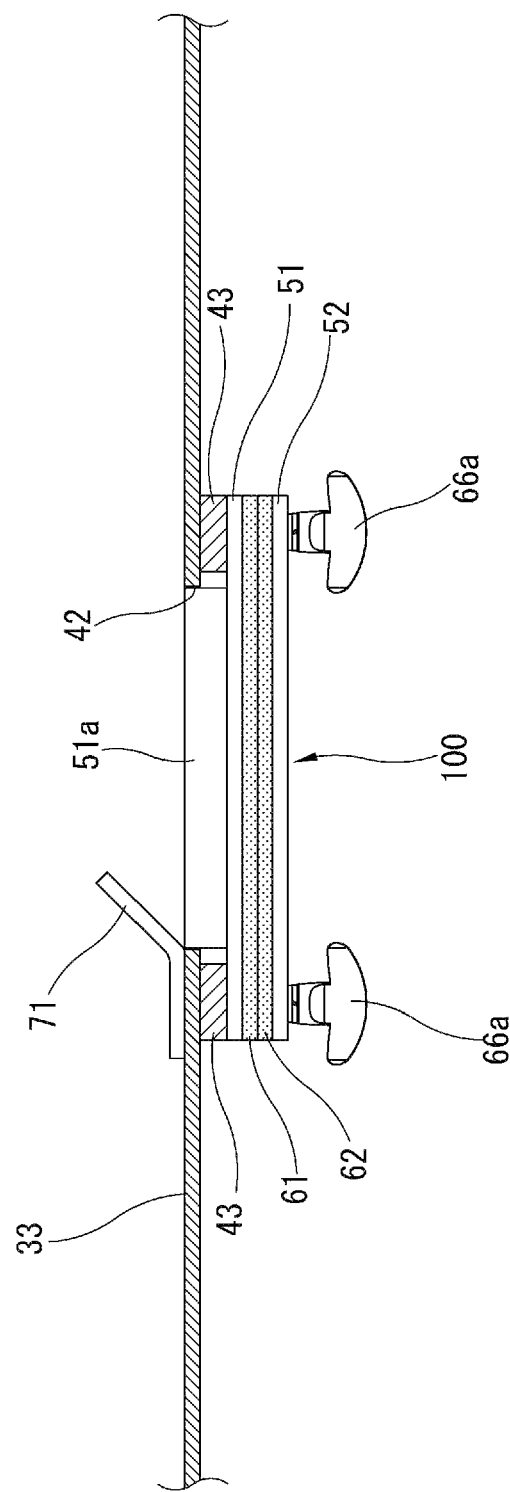
FIG. 15 is a sectional view similar to FIG. 6, which shows an embodiment equipped with a flapper.

Next, FIG. 15 shows an embodiment in which a flapper 71 obliquely projecting toward the inside of the flow passage is added along the side edge on the upstream side of the window part 42 of the duct body 101. The flapper 71 is formed by, for example, bending, at an appropriate inclination angle, a belt-like metal plate, and is attached to the inner wall surface of the side wall 33 by, for example, welding. In this way, in this embodiment in which the flapper 71 is provided, air flow is guided toward the inner side at the position just before the upstream side of the window part 42, and thereby the leakage of air flow through the window part 42 (in particular, the gap between the restraint member through holes 63 and the chain 5) becomes further small.

The flapper 71 is set to have a size (that is, a projection amount toward the inside of the window part 42) and an angle by which the interference does not occur even if the vibration of the chain 5 occurs, in a state in which the chain 5 passes through the restraint member through holes 63. In addition, although an illustration is omitted, the flatter 71 may be formed in a so-called hinge shape, such that its inclination angle can be arbitrarily changed.

As the above, although one embodiment of the present invention has been explained, the present invention is not limited to the above embodiment, and various change can be carried out.

For example, each of the inner plate 51, the outer plate 52, and the cover plates 53, 54 may be made of a material having rigidity, and it may be made of, for example, high-rigidity resin.

In addition, although the duct body 101 is provided with the window parts 42 at respective two positions on the front and rear sides of a side wall in the illustrated example, a plurality of window parts 42 can be further provided as needed.

In addition, although the blowing duct 1 (duct body 101) is configured as a component different from the casing 19 of the blowing fan 20 in the illustrated example, a configuration can be used in which the distal end part of the casing 19 having a spiral shape is formed as a duct body including the window parts 42. That is, the blowing duct of the present invention can be configured as part of the blowing fan.

In addition, as a vehicle restraint member, it is not limited to the above-mentioned chains 5 or belts, even in a case where stick-shaped vehicle restraint members are used, the present invention can be similarly applied.

In addition, as a fixing means for fixing the cover plates 53, 54, and the chain plate set 100, it is not limited to the above-mentioned screw holes 45 and attachment screws 66, and, for example, a mechanism such as a buckle-shaped clamp which can be easily attached and detached can be appropriately used.

The invention claimed is:

1. A blowing duct for a chassis dynamometer, comprising:
a duct body including a bottom wall, a top wall and a pair of side walls that form a flow passage having a rectangular cross section, and provided to a discharge part of a blowing fan such that a distal end opening thereof is arranged so as to face a front surface of a vehicle;
at least one vertically elongated window part provided to each of the pair of side walls;
a plurality of plate attachment parts provided at equal intervals so as to be arranged along each of side edges of the window part, so as to virtually divide the window part into a plurality of sections arranged vertically;
an inner plate and an outer plate each having rigidity, wherein each of the inner plate and the outer plate has a size set to cover one or some of the plurality of sections, is detachably attached to the window part via the plate attachment parts at a height position corresponding to that of a vehicle restraint member, and includes an opening part through which the vehicle restraint member passes;
an elastic sheet member supported by being sandwiched between the inner plate and the outer plate, including a restraint member through hole smaller than the opening part, and formed with one or a plurality of slits extending from an opening edge of the restraint member through hole to an outer peripheral side thereof; and a cover plate having a size set to cover one or some of a plurality of the sections, and detachably attached to a section except a section at which the inner plate and the outer plate are positioned, via the plate attachment parts.

2. The blowing duct for the chassis dynamometer according to claim 1, wherein the cover plate is composed of a first cover plate having a size set to cover one of the sections, and a second cover plate having a size set to cover the plurality of the sections, and wherein the first and second cover plates are used to cover one window part by being combined with each other.

3. The blowing duct for the chassis dynamometer according to claim 1, wherein a plurality of elastic sheet members are limited and sandwiched between the inner plate and the outer plate, and wherein the elastic sheet members each have a slit, and a position of the slit of each of the elastic sheet members is different from each other.

4. The blowing duct for the chassis dynamometer according to claim 1, wherein the attachment parts are screw holes formed at each of the side edges of the window part, and screws passing through the inner plate and the outer plate or the cover plate are screwed to the respective screw holes.

5. The blowing duct for the chassis dynamometer according to claim 1, further comprising a flapper along a side edge on an upstream side of the window part so as to obliquely project toward an inside of the flow passage.

\* \* \* \* \*